| United States Patent [19] | [11] Patent Number: 4,902,426 |
| --- | --- |
| Macedo et al. | [45] Date of Patent: Feb. 20, 1990 |

[54] ION EXCHANGE COMPOSITIONS

[75] Inventors: Pedro B. Macedo, 6100 Highboro Dr., Bethesda, Md. 20817; Theodore A. Litovitz, 3022 Friends Rd., Annapolis, Md. 21401; Hamid Hojaj, Bethesda, Md.

[73] Assignees: Pedro B. Macedo, Bethesda; Theodore Aaron Litovitz, Annapolis, both of Md.

[21] Appl. No.: 196,904

[22] Filed: May 20, 1988

Related U.S. Application Data

[63] Continuation-in-part of Ser. No. 68,133, Jun. 30, 1987, abandoned, which is a continuation-in-part of Ser. No. 932,882, Nov. 20, 1986, abandoned.

[51] Int. Cl.$^4$ ............................................. B01D 15/08
[52] U.S. Cl. .................................. 210/656; 210/198.2; 210/502.1; 210/635; 210/682; 210/683; 210/688; 65/31; 156/663; 156/667; 423/249; 423/263; 423/DIG. 14; 501/32; 501/39; 502/439
[58] Field of Search ..................... 501/32, 39; 156/663, 156/667; 423/DIG. 14, 263, 249; 210/681, 682, 683, 198.2, 502.1, 635, 688; 65/31

[56] References Cited

U.S. PATENT DOCUMENTS

| 2,106,744 | 2/1938 | Hood et al. | 502/439 |
| 2,340,013 | 1/1944 | Nordberg et al. | 65/31 |
| 2,472,490 | 6/1949 | Plank | 501/39 |
| 2,920,971 | 1/1960 | Stookey | 501/38 |
| 2,933,857 | 4/1960 | Stookey | 65/33 |
| 2,943,059 | 6/1960 | Beck et al. | 501/45 |
| 3,113,008 | 12/1963 | Elmer | 156/663 |
| 3,549,524 | 12/1970 | Haller | 210/656 |
| 3,923,688 | 12/1975 | Hammel et al. | 501/80 |
| 3,938,974 | 2/1976 | Macedo et al. | 501/37 |
| 4,178,270 | 2/1978 | Fujita et al. | 210/682 |
| 4,333,847 | 6/1982 | Tran et al. | 210/682 |
| 4,469,628 | 9/1984 | Simmons et al. | 210/688 |
| 4,648,975 | 3/1987 | Barkatt et al. | 210/198.2 |

FOREIGN PATENT DOCUMENTS 0186128  7/1986  European Pat. Off. ............ 156/667

OTHER PUBLICATIONS

Amphlett, C. B., "Inorganic Ion Exchangers" Elsevier Publishing Company, 1964, pp. 84–93.
Sawai, I., "Glass Technology in Japan", *Glass Technology*, vol. 2, No. 6, Dec. 1961, pp. 243–246.
Doremus, "Glass Science", Wiley-Interscience, New York, 1973.
Kingery et al, "Introduction to Ceramics", Wiley-Interscience, New York, 1976.

*Primary Examiner*—Mark L. Bell
*Assistant Examiner*—Anthony J. Green
*Attorney, Agent, or Firm*—Irene J. Frangos; D. Douglas Price

[57] ABSTRACT

The present invention comprises a process for separating rare earth ions or actinide ions or mixtures thereof in solution by passing the solution through an ion exchange material to separate the rare earths or actinides or mixtures thereof. The ion exchange material has a surface area of about 5–1500 m$^2$/g. The ion exchange material is impregnated with a liquid containing alkali metal cations, Group Ib metal cations, ammonium cations, organic amines or mixtures thereof, at a pH range above about 9. A plurality of fractions of the solution is collected as the solution passes through the ion exchange material, preferably in a column. This process is particularly preferred for separating rare earth ions and especially lanthanum and neodymium. It is particularly preferred to purify lanthanum to contain less than 0.1 ppm, preferably less than 0.01 ppm, of neodymium. In another embodiment, the present invention comprises a method of producing a porous silicate glass containing at least one transition metal oxide additive selected from a group consisting of the bottom two rows of Group VIII of the Periodic Table. This method comprises preparing a base glass from a melt which contains 40–80 mol percent of silica and up to 10 mol percent of one or more transition metal oxide additives selected from said group or of precursors of said oxide additives, separating said base glass by heat treatment into at least a soluble phase and an insoluble phase, leaching out the soluble phase. In yet another embodiment, the present invention comprises an ion exchange material consisting of a porous glass or silica gel including at least about 0.2 mol percent of a transition metal oxide or hydrous metal oxide and containing at least 0.3 mol percent of alkali metal cation, Group Ib metal cation, ammonium, organic amines, or mixtures thereof.

18 Claims, No Drawings

ION EXCHANGE COMPOSITIONS

This is a continuation-in-part of Ser. No. 068,133, filed June 30, 1987, which in turn is a continuation-in-part of Ser. No. 932,882, filed Nov. 20, 1986, now both abandoned.

BACKGROUND OF THE INVENTION

Field of the Invention

The present invention relates to novel glasses with a high silica content as well as a significant content of additives such as ruthenia and other Group VIII metal oxides, and to methods of conveniently producing such glasses in porous form, in which they can be used in applications requiring a large surface area, such as chemical sorption, ion exchange, or catalysis. Porous glasses, including compositions containing high levels of silica, have been known for some time, but types and amounts of metal oxide additives which can be introduced into such compositions, as well as practical methods of introducing such additives, have been very limited. Introduction of metal oxides into the surface or porous structure of glasses permits useful variations of their properties. The present invention relates to novel methods which permit the introduction of significant amounts of metal oxide additives, variable over a broad range, into porous glass compositions. The method comprises melting a phase separable glass composition, for instance an alkali borosilicate glass, with a preselected amount of metal oxide additive. Upon heat treatment to separate the glass into a soft, leachable phase and a hard, non-leachable phase, a substantial amount of the metal oxide follows the hard phase, and accordingly it remains in the porous glass structure upon subsequent leaching in an aqueous, usually acidic, solution. Subsequently, the porous glass can be subjected to further treatments, for instance treated with alkali metal ions, ammonium ions to convert it into a highly effective ion exchange material. According to the present invention such treatments can also follow other methods of introducing the metal oxide additive, for instance introducing it from the solution used to leach the soft phase, especially in the case of species such as alumina which tend upon co-melting and phase separation to segregate to a large extent into the soft, leachable phase. One reported application of porous glasses is their use as ion exchangers, for instance as cation exchangers, following surface treatments with ionic solutions, as described in U.S. Pat. No. 4,469,628 (Simmons et al.). However, conversion of porous glasses into ion exchange materials following the introduction of an oxide additive, for instance by incorporating the additive in the hard phase of a phase separable glass followed by leaching, has not been reported. U.S. Pat. No. 4,659,512 (Macedo et al.) describes the preparation of an ion exchange material which comprises treating a porous support having interconnected pores, said porous support having interconnected pores, said porous support being a silicate glass or silica gel, with an organic amine, for instance a neutral or basic water-soluble alkylene amine such as triethylenetetramine. Ion exchange materials prepared according to this process are used to remove metal species such as cobalt from liquids, in particular from aqueous solutions. Again, the use of this process using porous silicate glasses with metal oxide additives as support has not been reported.

This invention further relates to the ion exchange separation of rare earth elements, actinides or mixtures thereof.

According to Jaffe, U.S. Pat. No. 2,897,050 the term "rare earths" is used to designate the group of elements between lanthanum, atomic number 57, and lutecium, atomic number 71, inclusive, and to these elements should be added yttrium, atomic number 39, and scandium, atomic number 21, which are nearly identical with rare earths in properties and usually occur together with them in natural deposits.

In addition, according to Jaffe, U.S. Pat. No. 2,897,050, since the rare earths are intimately mixed together in the natural states and have very similar chemical and physical properties, differing each from the other very slightly, they cannot be easily separated. A number of processes have been suggested for separating the rare earth elements. These include: fractional crystallization or precipitation, solvent extraction, and ion exchange. However, according to the same patent, all these methods are tedious and difficult to control.

The actinide elements constitute another group of important elements which resemble each other in chemical properties. They are also similar, in particular when ions of the same oxidation states are considered, to the rare earths.

The most widely used technique of separating the rare earths is solvent extraction, described by Peppard et al., U.S. Pat. No. 2,955,913, and by Chiola et al., U.S. Pat. No. 3,598,913.

Ion exchange offers significant advantages over solvent extraction, including a much smaller plate height, applicability to multi-element isolation and higher ultimate purity (Kirk-Othmer, Encyclopedia of Chemical Technology, 3rd edition, Volume 19, Wiley-Interscience, New York, 1982). Ion exchange is not widely used, however, because it relies on elution alone to separate the various rare earths, and therefore many theoretical plates are necessary, requiring extremely fine control over operating conditions to prevent band broadening, as well as slow flow rates and limited influent concentration. Another limiting feature of the elution technique is that the order of elution is always determined by the relative magnitude of the stability constants of the complexes of the various rare earths, and that in all cases heavier lanthanides have higher stability constants and therefore desorb more rapidly, as described by Spedding et al., U.S. Pat. No. 2,798,789 and by Choppin et al., U.S. Pat. No. 2,925,431. For instance, $Nd^{3+}$ is eluted before $La^{3+}$.

It is an object of the present invention to provide high silica porous glass compositions with significant amounts of metal oxide additives.

A further object of the present invention is to provide a convenient method of making high silica glasses with significant amounts of metal oxide additives in the porous form.

Yet a further object of the present invention is to provide ion exchange materials or sorbents which have high capacity, high selectivity, high chemical durability, or any combinations of these properties.

Another object of the present invention is to provide a convenient method of making ion exchange materials based on high silica porous glass.

Another object of the present invention is to provide catalysts or chromatographic materials which have high efficiency, high selectivity, high chemical durability, or any combination of these properties.

Another object of the present invention is to provide durable porous glass materials which can be used as catalyst supports, enzyme supports, supports for chromatographic stationary phases, or supports for chemical reagents.

Another object of the present invention is to provide a method for making a corrosion resistant porous glass which can be used as a support for a dye, an enzyme, or a dye-enzyme combination in a sensor device for measuring chemical or physical properties in aqueous media over significant time periods.

It is an object of this invention to provide a process for the separation of rare earth values, actinides or mixtures thereof by ion exchange in which a substantial extent of separation takes place without the introduction of a complexing agent.

A further object of the present invention is to provide a process of selectively removing more strongly complexable rare earth ions from a stream containing less strongly complexable rare earth ions.

Yet a further object of the present invention is to provide ion exchange materials a process for separation of rare earths, actinides or mixtures thereof which uses high capacity, high selectivity, or a combination of these properties.

Another object of the present invention is to provide a process of producing highly pure lanthanum with a very low content of heavier rare earths for optical applications.

Yet another object of the present invention is to provide a method of producing highly pure individual rare earths or groups of rare earths.

In accordance with the present invention, porous glasses with transition metal oxide additives are prepared by introducing such oxides, or salts which produce them upon heating, into the original batch composition, for instance a silica-boron oxide-alkali oxide mixture, which is used to prepare a phase separable glass. The mixture is melted, cooled down to form a glass, and heat treated to separate a nonleachable, silica-rich, "hard" phase from a more soluble "soft" phase which contains considerably less silica than the hard phase. The soft phase is removed by leaching in an aqueous, usually acidic, medium. The crux of this embodiment of the invention is the selection of an appropriate transition metal additive and of an appropriate amount of such additive in the initial mix so as to cause, at the end of the leaching step, the majority or a substantial fraction of the additive to remain in or with the resulting porous glass formed by the undissolved hard phase. The resulting porous glasses can be used without further treatment, for instance as chromatographic stationary phases, sorbents, or catalysts, or chemically treated for such uses as ion exchange or supporting reagents, catalysts, chromatographic agents, enzymes, or indicator dyes. According to EP Application no. 85116188.5 (Beaver) Group IVa, but not Group VIII, oxides can be retained in the hard phase.

The incorporation of transition metal oxides which have catalytic properties in the batch composition of phase-separable glasses, followed by heat treatment and selective leaching of a soft phase, can be used to produce catalysts with a high specific activity. When such oxides, for instance ruthenia, remain to a significant extent upon phase separation in the hard phase or in the interphase between the hard and the soft phases, respectively, subsequent leaching leaves a large fraction of the additive oxide on the surface of the resulting porous glass, where it can come in contact with reactant molecules and cause effective catalysis of chemical processes. The processes of the present invention can be used to produce porous glasses with metal oxide additives such as the oxides of ruthenium, rhodium, palladium, rhenium, osmium, iridium, and platinum, which can exhibit catalytic activity ven when present at low concentrations.

Certain uses of porous glasses require a high degree of corrosion resistance. These include uses as chromatographic supports in media having high pH, high temperature or both, as well as uses as supports for indicator dyes in miniature probes, for instance probes used for in vivo blood analysis, which are highly susceptible to degradation by dissolution due to their small dimensions. Doping with a metal oxide additive such as zirconia prior to phase separation and leaching can lead to significant improvement in the chemical durability of the corresponding porous glasses.

Unlike other processes of producing porous glass with a high transition metal oxide content, which require the silica levels in the glass to be lower than 40 mol percent and the phosphorus oxide content to be at least 20 mol percent, according to U.S. Pat. No. 2,943,059, the current process is applicable to glasses with a high silica content and does not require the presence of phosphorus oxide.

Another embodiment of the present invention consists of producing an ion exchange material by treating a phase-separated glass with an aqueous, usually acidic, solution of a metal ion to effect simultaneous leaching of the soft phase and impregnation with a metal additive.

Porous glasses prepared by this process or by co-melting as described above can be activated, usually at moderately high pH, with an aqueous solution which contains alkali metal ions, ammonium ions, Group Ib ions, organic amines or combinations of any of these species produce highly effective ion exchange materials. The introduction of a metal oxide additive can lead to increased ion exchange capacity or selectivity as well as to improved corrosion resistance. The corrosion resistance controls ion exchanger performance in applications involving prolonged exposure to aqueous media or contact with corrosive media involving, for instance, a high pH value, a high temperature, or both.

The present invention comprises also a process for separating rare earth ions, actinides ions, or mixtures thereof in solution by passing the solution through an ion exchange material to separate the rare earths, actinides, or mixtures thereof. The ion exchange material has a surface area of about 5–1500 $m^2/g$. The ion exchange material may include from 0 to about 35 mol percent, preferably from 1 to 30 mol percent, of a metal oxide or hydrous metal oxide. The metal oxide or hydrous metal oxide is selected from the group consisting of the transition metals of Groups IIIa, IVa, Va, VIa, VIIa, VIII, Ib, and IIb of the Periodic Table, aluminum, gallium, indium, thallium, tin, lead, bismuth, beryllium, the actinides and mixtures thereof, preferably titania zirconia, hafnia, thoria and mixtures thereof. The ion exchange material is impregnated with a liquid containing alkali metal cations, Group Ib metal cations, ammonium cations, organic amines, or mixtures thereof, at a pH range above about 9, for a period of time to provide a distribution of the cations within the ion exchange material. The preferred cations are alkali metal cations, ammonium cations, organic amines, or mixtures thereof. The ion exchange material preferably contains about 0.3 mol percent to about 10 mol percent of alkali metal cations. A plurality of fractions of the solution is collected as the solution passes through the ion exchange material, preferably in a column. This process is particularly preferred for separating rare earth ions and especially lanthanum and neodymium. It is particularly preferred to purify lanthanum to contain less than 0.1 ppm, preferably less than 0.01 ppm, of neodymium.

The ion exchange material is preferably porous glass. The porous glass is prepared by a process comprising producing a base glass from a melt which contains 40 to 80 mol percent of silica and between 0 and 35 mol percent of one or more transition metal oxides selected from the group consisting of the transition metals of Groups IVa, Va, VIa, VIIa and VIII of the Periodic Table and of the actinides, separating the base glass by heat treatment into a least a soluble phase and an insoluble phase, and leaching out the soluble phase to obtain a porous glass containing at least 50 mol percent silica and preferably at least 0.2 mol percent of the transition metal oxides. Alternatively, the porous glass is prepared by melting a base glass which contains 40 to 80 mol percent silica, separating the base glass by heat treatment into at least a soluble a soluble phase and an insoluble phase, leaching the soluble phase and treating the phase separated glass with a solution of one or more salts of said transition metals of Groups IIIa, IVa, Va, VIa, VIIa, VIII, Ib and IIb of the Periodic Table, aluminum, gallium, indium, thallium, tin lead, bismuth, beryllium and the actinides.

DESCRIPTION OF THE PREFERRED EMBODIMENTS

In view of the literature cited above, it is unexpected to find that it is possible to melt borosilicate glass compositions which contain significant amounts of transition metal oxides belonging to the two lower rows of Group VIII, and to induce liquid/liquid phase separation in the resulting glasses by heat treatment without causing crystallization, thus making it possible to leach out the more soluble silica-poor soft phase and to leave behind a high-silica porous glass skeleton. Furthermore, it is unexpected to find that, upon leaching, these remain to a large extent in or with the silica-rich hard phase which forms the porous glass.

The process of melting the original glass in the presence of an additive oxide, followed by phase separation and leaching, relates to the production of glasses which contain at least 50 mol percent $SiO_2$, preferably at least 60 mol percent $SiO_2$, and, in addition, 0.01 to 35 mol percent of one or more transition metal oxides selected from the group consisting of the oxides of Groups IVa, Va, and VIa, and the bottom two rows of Groups VIII and VIIa of the Periodic Table, and of the actinides. (Group nomenclature is according to Cotton and Wilkinson, Advanced Inorganic Chemistry, 4th ed., Wiley-Interscience, New York, 1980.) Examples of such oxides may include $Ti_2O_3$, $TiO_2$, $ZrO_2$, $HfO_2$, $ThO_2$, $NbO_2$, $Ta_2O_5$, $Cr_2O_3$, $ReO_2$, $RuO_2$, $Rh_2O_3$, $RhO_2$, $PdO$, $Os_2O_3$, $OsO_2$, $IrO_2$, $PtO$, and $PtO_2$. Preferred glass compositions include 0.2-25 mol percent of the dioxides of the elements of Group IVa or 0.01-10 mol percent of the dioxides of the elements of the bottom two rows of Group VIII and rhenium. The most preferred compositions include 1-25 mol percent of one or more oxides belonging to the group consisting of $TiO_2$, $ZrO_2$, and $HfO_2$.

Surface treatments which have been proposed to produce modified porous glasses with metal additives comprise leaching a phase-separated borosilicate glass in a strong mineral acid solution, followed by washing out the acid with water and then immersing the glass in a solution of a desired metal salt, as described for example in U.S. Pat. No. 2,340,013 (Nordberg et al.). However, in all previously described cases the introduction of the additive is a separate step, performed after the preparation of the porous glass by leaching and washing. It is surprising to find that the two steps can be combined and carried out simultaneously. In one embodiment of the present invention the phase separated glass can be treated in a solution of a salt of the desired additive. Solutions of many of the salts of the additives used in the present invention, such as $Al(NO_3)_3$, $ZrO(NO_3)_2$, and $Zr(NO_3)_4$, are acidic. It is also possible to enhance the acidity of such a solution by adding a suitable mineral acid, for instance $HNO_3$, if necessary. The treatment with such metal salt solutions produces in a single step a leached porous high silica glass with the desired additive, for instance Al or Zr, without requiring separation between the leaching and additive introduction step and without requiring a precipitation step following the treatment with the additive salt solution. This combination of steps can be used even at relatively low temperatures such as room temperature.

Furthermore, the properties of ion exchange materials comprising porous glasses modified with metal oxides according to the processes of the present invention are quite unexpected. Modification of porous silicate glasses and silica gel with solutions of metal additives, as described in U.S. Pat. No. 4,333,847 (Tran et al.) and in U.S. Pat. No. 4,178,270 (Fujita et al.), has been aimed at improving the ion exchange capacity of the silica material with respect to simple anions and ions of the transition elements, such as cobalt, which can form anionic complexes. This is based on the wellknown observation that silica, as compared with titania, zirconia, alumina, etc., is exclusively and effectively a cation exchanger. For instance, according to Amphlett, Inorganic Ion Exchangers, Elsevier, 1964, "Hydrous silica exhibits cation exchange only, the high electron affinity of the tetravalent silicon ion resulting in a very low basicity for the hydroxyl group; the hydrogen atoms of the latter are readily replaced by cations even in acid solution. Other quadrivalent oxides such as $SnO_2$, $ThO_2$, $TiO_2$ and $ZrO_2$ possess both cation and anion-exchange properties, depending upon the pH of the solution . . . , . Amphoteric oxides such as hydrous alumina may absorb either cations or anions depending upon the pH of the solution." Furthermore, the zeta potential of silica is highly negative throughout the pH range of at least between 3 and 10, according to U.S. Pat. No. 4,178,270, while the zeta potentials of alumina and zirconia are positive up to pH 8 and that of titania up to pH 4.5-7. Accordingly, as documented by Amphlett and in U.S. Pat. Nos. 4,333,847 and 4,178,270, titania, zirconia, and alumina are expected to increase the effectiveness in absorbing anionic species. On the other hand, certain metal species always appear in aqueous solutions in cationic form. These include the alkali metal ions, in particular cesium, which is one of the major common radioactive contaminants in streams generated in the nuclear industry. In the case of such ions silica can be expected, on the basis of the discussion above, to be much more effective as an ion exchanger than supported or unsupported alumina, titania and zirconia. Indeed, untreated silica reacts only slowly with cations such as cesium ions because of the strong association of surface protons to the silica structure in the near-neutral pH range. However, this difficulty can be overcome by pretreating the silica surface with non-radioactive alkali metal cations, non-radioactive Group Ib metal ions, ammonium cations, or organic amines, in a moderately basic medium, without occurrence of substantial dissolution of the glass, according to U.S. Pat. No. 4,469,628 (Simmons et al.) and U.S. Pat. No. 4,659,512 (Macedo et al.). Such activated silicate glass can be expected to be more effective as a cation exchanger, for instance for cesium in near-neutral solution, than materials with a similar surface to weight ratio which have their surface covered, partially or entirely, by alumina, titania or zirconia.

In contrast, it has now been unexpectedly found that porous glasses prepared according to the process described above exhibit considerably higher capacity for the removal of cesium from near-neutral streams when oxide additives such as zirconia or alumina are introduced onto the porous glass surface by means of one of the processes of the present invention, viz. inclusion in the original melt or sorption from an undersaturated solution, previous to the conversion of the porous glass into an ion exchanger.

In addition, porous glasses with oxide additives such as titania and zirconia introduced by means of the processes of the present invention can be used to absorb other cations, anions, and metal species such as transition metals, for instance cobalt, and actinides, for instance uranium and plutonium, which can be present in aqueous media in both cationic and anionic forms.

Another advantage of the introduction of oxide additives such as zirconia or alumina into high silica porous glass ion exchangers according to the processes of the present invention is a substantial improvement in corrosion resistance in aqueous media. This prolongs the effective service life of the ion exchanger. This improvement is also important if the porous glass is subsequently used as a catalyst, a support for chromatography or for chemical reagents, catalysts, enzymes, or indicator dyes. Yet another advantage results from the ability to introduce the oxide additive into the porous glass structure and its surface in a highly dispersed form by using the processes of the present invention. This enhances, for instance, the catalytic activity of such oxide additives, since individual oxide molecules are exposed to contact with surrounding media rather than bound to and screened by other molecules of the same type.

Overall, porous glasses containing metal additives such as zirconium, aluminum and titanium, subjected to treatment with alkali ions, Group Ib ions, ammonium ions, organic amines, or combinations of the above, in moderately basic media, are consistently found to have significantly better performance as ion exchange materials compared with porous silicate media which have not been prepared by combination of metal additive doping and subsequent primary ion exchange treatment.

In summary, the present invention describes a method for producing high silica porous glass with transition metal oxide additives, which involves the following steps:

(a) glass melting
(b) phase separation
(c1) leaching or (c2) combined leaching and additive impregnation
(d) surface treatment
(e) further chemical or thermal treatments The transition metal additive species is introduced during step (a), step (c2), or both. Steps (d) and (e) are optional. (a) Glass melting In the preferred embodiment of the invention cited above the composition range of the base glass would be

TABLE 1

| | Mol Percent | | |
| --- | --- | --- | --- |
| | Broad Range | Preferred Range | Most Preferred Range |
| $SiO_2$ | 30–80 | 40–70 | 44–59 |
| $B_2O_3$ | 15–50 | 24–42 | 24–37 |
| $R_2O$ (as $Na_2O$) | 4–11 | 4–10 | 6–10 |
| $Al_2O_3$ | 0–5 | 0–3 | 0–2 |
| $M_xO_y$ | 0.2(0)–35 | 0.5(0)–30 | 1(0)–25 |
| $N_uO_z$ | 0.01(0)–25 | 0.05(0)–10 | 0.2(0)–25 |

In this Table, the amount of $SiO_2$ or a part of it may be replaced by a corresponding amount of $GeO_2$. $R_2O$ denotes any combination of alkali metal or alkaline earth metal oxides. $M_xO_y$ designates one or more oxide additives selected from the group consisting of the oxides of Groups IVa, Va and VIa of the Periodic Table, or of the actinides. $N_uO_z$ designates one or more oxide additives selected from the group consisting of the oxides of Groups VIII and VIIa of the Periodic Table. It should be noted that for all three composition ranges listed in Table 1 two lower limits appear in the Table, and one of them is zero. The zero lower limit for $M_xO_y$ applies in the case of only $N_uO_z$ is added to the glass and in the case that $M_xO_y$ is added only in the course of step (c2). The zero lower limit for $N_uO_z$ applies in the case that only $M_xO_y$ is added to the glass or that $N_uO_z$ is added only in the course of step (c2). In practice, the amounts of $M_xO_y$ and $N_uO_z$ are limited by their solubilities in the alkali borosilicate melt and by the capacity of the resulting glass to resist crystallization upon subsequent cooling. The base glass composition is most preferably selected such that a homogeneous glass is easily made below about 1500° C., i.e. the mixture has a viscosity of below 1000 poise at 1500° C. Conventional glass melting procedures are used.

(b) Phase separation
(c1) Leaching
(c2) Combined leaching and additive impregnation In one embodiment of the present invention, the heat-treated, phase-separated glass is treated with a solution of the additive, such as aluminum or zirconium, in order to leach out the soft phase and to introduce the additive onto the porous glass surface. This embodiment of the invention is the one used in all cases where the additive has not been incorporated in the original melt, i.e. where no $M_xO_y$ or $N_uO_z$ is intentionally introduced into the melt composition used in step (a). However, this embodiment of the invention can also be used, if desired, to introduce an additive from solution onto a porous glass structure prepared from a melt composition formulated in step (a) to contain the same additive, another additive, or a combination of additives.

The additives used in step (c2) are selected from the group consisting of the oxides of the alkaline earth metals, of the transition metals consisting of Groups IIIa, IVa, Va, VIa, VIIa, VIII, Ib, and IIb of the Periodic Table, and of aluminum, gallium, indium, thallium, tin, lead, bismuth, the rare earth elements, and the actinides. The preferred oxides are those of aluminum, gallium, tin, lead, the alkaline earth metals, lanthanum, the rare earth elements, vanadium, chromium, manganese, iron, cobalt, nickel, copper, zinc, titanium, zirconium, hafnium, thorium, and ruthenium. The most preferred oxides are those of aluminum, iron, and zirconium. The porous glasses modified by treatment with a solution of the additive in step (c2) contain at least 60 mol percent silica, preferably at least 70 mol percent $SiO_2$, most preferably at least 75 mol percent $SiO_2$ on a dry basis. The amount of additive introduced in step (c2) is between 0.005 and 25 mol percent, preferably between 0.1 and 10 mol percent, most preferably between 1 and 10 mol percent. The solution used for combined leaching and impregnation preferably contains at least 0.02 g/L of the metal additive on an oxide basis, most preferably at least 2 g/L. The pH is preferably below 4, most preferably below 3. In the case of many metal additives, such as aluminum and zirconium, salt solutions containing sufficiently high concentrations of the metal ion are, in general, significantly acidic. In the case of soluble neutral or near-neutral salts acid may be added to the solution to facilitate leaching. A preferred technique consists of the use of solutions wherein the concentration of the metal species does not exceed, or does not significantly exceed, the solubility limit. The contact between the glass and the solution may be carried out at relatively low temperatures, such as room temperature, or at higher temperatures. If the temperature approaches the boiling point of the solution it is necessary to take precautions to prevent excessive evaporation losses and thermal precipitation in the additive solution.

(d) Surface treatments

Following the treatment of the glass with the leaching/additive impregnation medium, it can be used as a sorbent, an anion exchanger, or a cation exchanger. The same applies to porous glasses prepared by co-melting according to step (a) or by a combination of co-melting and treatment with a leaching/impregnation solution. In a preferred embodiment, the performance of the glass as a cation exchanger is improved by subjecting it to further treatment with a liquid containing alkali metal cations, Group Ib metal cations, ammonium cations, organic cations, or mixtures thereof, said liquid being maintained at a moderately alkaline pH.

(e) Further chemical or thermal treatments

In addition to the preparation of ion exchange or sorption media based on porous glasses with oxide additives, which was described in the previous paragraph, porous glasses incorporating metal oxide additives can be used in other applications. For certain applications the porous glass with the oxide additive has to be dried. In some cases rinsing before drying can make the resulting dried glass better and more uniform. The dried porous glass can be used without further treatment, for instance as a catalyst or a chromatographic support. Alternatively, the porous glass can be treated with surface activation agents such as organosilanes, and then reacted with suitable molecules to attach a desired species such as an organic stationary phase, an enzyme, a catalyst, a reagent, or an indicating dye for use in a chemical sensor device. Furthermore, such porous glass can be subjected to further thermal treatment to produce a solid glass or glass foam. The thermal treatment can be preceded in certain cases by a further stage of impregnation with a dopant, for instance as described in U.S. Pat. No. 4,110,096 (Macedo et al.). The resulting solid glass can be used, for instance, as an optical waveguide with a controlled index of refraction or in applications requiring a controlled thermal expansion coefficient or thermal or electrical conductivity. Glass foam with a low thermal expansion coefficient can be used, for instance, in applications involving lightweight construction and insulation.

It has been surprisingly found that ion exchange materials prepared according to the above are very effective in separating rare earths from each other. One unique feature of these materials is that effective separation of the rare earths takes place upon passing a solution in which several of them are present through a bed made up of the material without adding a complexing agent. This simplifies the operation and enhances the effectiveness of the separation since the sorption process, rather than subsequent elution alone, is highly selective. Another important distinction between the present invention and previously reported ion exchange operations is that the more strongly complexable rare earth ions such as $Nd^{3+}$ are retained on the bed in preference to less strongly complexable rare earth ions such as $La^{3+}$. This can be a major advantage in cases where it is necessary to remove small amounts of more strongly complexable rare earth ions from a majority of less strongly complexable ions, for instance in removing traces of Nd from La used in light transmission applications, since sorption of a minority contaminant from a flowing stream of the majority species is the preferred mode of decontamination by means of ion exchange, providing much higher capacities and higher decontamination factors than an operation involving sorption of the majority species.

The literature also adequately describes the preparation of silica gel compositions which can be employed in this invention when treated to contain suitable amounts of transition metal oxide additives. These materials are available, for example, as LUDOX silica gel, sold by E. I. DuPont de Nemours & Co., which contains 0.08 to 0.6 wt. percent $Na_2O$ as titrable alkali believed to be present as siliconbonded NaO-groups.

Another class of materials which can be employed in this invention includes polymerized or partially polymerized systems prepared by means of processes associated with the sol-gel technique and consisting of single-component (in particular, high-silica) or multi-component (e.g., $Na_2O$-$B_2O_3$-$SiO_2$, $SiO_2$-$TiO_2$) compositions (Yoldas, J. Mater. Sci., 14, 1843 (1979); Yoldas, J. Noncryst. solids 38, 81 (1980); Mukherjee, in Materials Processing in the Reduces Gravity Environment of Space, Elsevier, 1982).

It was found that introduction of the metal oxide or hydrous metal oxide additive greatly improves the effectiveness of the porous glass in separating rare earths. Treatment of the porous glass with alkali metal cations, Group Ib metal cations, ammonium cations, organic amines or mixtures thereof, is necessary to produce materials with significant capacity for the separation of rare earth ions. Surprisingly it was found that while in the case of glasses containing low level of metal oxide or hydrous metal oxide additives, performance in separating rare earth ions improves with increasing additive content; this trend is arrested when a certain additive content is reached. Glasses with higher additive content do not appear to perform significantly better than glasses with a moderate additive content, in the case of $ZrO_2$ between about 10 and about 15 weight percent of the porous glass material.

The invention is further illustrated by the following specific, non-limiting examples:

EXAMPLE 1

This Example illustrates the melting of glass compositions which can be subsequently used to produce porous glass with metal oxide additives.

The glass compositions shown in Table 2 were prepared by mixing together and melting batches made up of the oxides listed in this Table or precursors of such oxides such as hydroxides (in the case of boron) or carbonates (in the case of the alkali metals). These batches were melted in platinum crucibles at temperatures up to about 1450° C. Glass rods drawn out of the melt were pulverized, dissolved in aqueous hydrofluoric acid and analyzed by means of dc plasma spectrometry to determine their composition.

TABLE 2

| Glass no. | Composition, mol % | | | | | | | | | |
|---|---|---|---|---|---|---|---|---|---|---|
| | $SiO_2$ | $B_2O_3$ | $Na_2O$ | $K_2O$ | $Al_2O_3$ | $TiO_2$ | $ZrO_2$ | $HfO_2$ | $RuO_2$ | $Cr_2O_3$ |
| 1 | 57.1 | 33.9 | 9.0 | | | | | | | |
| 2 | 58.9 | 31.0 | 6.8 | 3.3 | | | | | | |
| 3 | 55.2 | 33.7 | 3.8 | 4.0 | | 3.3 | | | | |
| 4 | 52.1 | 30.9 | 9.0 | | | 8.0 | | | | |
| 5 | 49.8 | 30.2 | 4.0 | 5.0 | 1.0 | 10.0 | | | | |
| 6 | 45.2 | 26.8 | 4.0 | 8.0 | 1.0 | 15.0 | | | | |
| 7 | 55.6 | 33.8 | 6.0 | 2.5 | | | 2.1 | | | |
| 8 | 54.2 | 33.7 | 9.4 | | 0.6 | | 2.1 | | | |
| 9 | 53.8 | 32.4 | 9.6 | | | | 4.2 | | | |
| 10 | 47.6 | 32.8 | 10.0 | | | | 9.6 | | | |
| 11 | 51.3 | 25.7 | 10.0 | | | | 13.0 | | | |
| 12 | 50.9 | 35.8 | 5.7 | 3.6 | | | | 4.0 | | |
| 13 | 57.0 | 33.7 | 9.0 | | | | | | 0.3 | |
| 14 | 58.4 | 30.7 | 6.7 | 3.2 | | | | | 1.0 | |
| 15 | 55.1 | 35.7 | 8.6 | | | | | | | 0.6 |

EXAMPLE 2

This Example illustrates the heat treatment of the batch glasses described in Example 1 to induce phase separation, followed by leaching of the soft phase and washing to produce porous high-silica glass.

Glass powders, made by grinding the rods prepared according to Example 1, sieving, and separating out the −20 +80 mesh fraction, or, in some cases, the rods themselves, were placed in a resistance-heated furnace and heat treated to separate the hard and the soft phase, respectively. Subsequently the powders or rods were immersed in a hot solution of a mineral acid or in an acidic salt solution to leach out the soft phase and washed with water to remove the residuals. The time and temperature of leaching were selected to ensure complete removal of the soft phase. In general, heat treatment was carried out over a period of between 1–17 hours at a temperature between 500°–650° C., and it was followed by leaching in HCl or $H_2SO_4$ for a period of between 1–72 hours at a temperature of 90°–100° C. In a few cases, an aqueous solution of the acidic salt $Al(NO_3)_3$ (17%) was used as the leaching medium at room temperature. The specific heat treatment and leaching schedules selected for the glass compositions listed in Table 2 are detailed in Table 3.

TABLE 3

| Glass no. | Heat Treatment | | | Leaching | |
|---|---|---|---|---|---|
| | Time hours | Temperature °C. | Acid | Time hours | Temperature °C. |
| 1 | 2 | 550 | 3M HCl | 3 | 100 |
| 1a | 2 | 550 | 17% $Al(NO_3)_3$ | 24 | 25 |
| 1b | 2 | 550 | 17% $Al(NO_3)_3$ + 3M $NH_4OH$ (pH 3) | 24 | 25 |
| 2 | 2 | 550 | 3M HCl | 2 | 95 |
| 3 | 15 | 500 | 3M HCl | 3 | 100 |
| 4 | 17 | 500 | 3M HCl | 4 | 100 |
| 5 | 2 | 570 | 3M HCl | 3 | 100 |
| 6 | 17 | 520 | 3M HCl | 3 | 100 |
| 7 | 3 | 550 | 3M HCl | 2.5 | 95 |
| 8 | 2 | 550 | 3M HCl | 3 | 100 |
| 9 | 2 | 550 | 3M HCl | 3 | 100 |
| 10 | 17 | 540 | 1.5M $H_2SO_4$ | 3 | 100 |
| 11 | 17 | 620 | 1.5M $H_2SO_4$ | 3 | 100 |
| 12 | 17 | 555 | 3M HCl | 3 | 100 |
| 13 | 17 | 556 | 3M HCl | 1 | 100 |
| 14 | 1 | 650 | 3M HCl | 16 | 90 |
| 15 | 17 | 555 | 3M HCl | 3 | 100 |

Porous Glasses No. 13 and No. 14 were dark greenish grey. Porous Glass No. 15 was green. All other porous glasses were colorless.

EXAMPLE 3

This Example illustrates the preparation of improved cation exchange porous glass materials by treatment of porous glasses with solutions containing alkali metal cations, ammonium cations, or mixtures thereof.

The various conditions of the primary ion exchange treatment are listed in Table 4. One volume of glass powder was usually treated with 4 volumes of the ion exchange solution.

TABLE 4

| Ion exchange method | Details |
|---|---|
| SA | 3M $NH_4OH$ + 3M $NaNO_3$, 17 hrs, 25° C. |
| A | 3M $NH_4OH$, 17 hrs, 25° C. |
| N | No treatment |

EXAMPLE 4

This Example illustrates the chemical compositions of several porous glasses prepared according to the procedures outlined in Examples 1–3.

Following preparation, each of the tested porous glasses was rinsed with de-ionized water, dried, dissolved in an aqueous hydrofluoric acid solution, and analyzed by means of dc plasma spectrometry. The results of the analysis of each porous glass are shown in Table 5.

TABLE 5

| Base glass | Ion exchange | Composition, wt % | | | | | | | | |
|---|---|---|---|---|---|---|---|---|---|---|
| | | $SiO_2$ | $B_2O_3$ | $Na_2O$ | $K_2O$ | $Al_2O_3$ | $TiO_2$ | $ZrO_2$ | $Cr_2O_3$ | $HfO_2$ |
| 1 | N | 95.0 | 5.0 | <0.1 | <0.1 | | | | | |
| 1a | N | 94.2 | 1.7 | 1.1 | 1.6 | 1.4 | | | | |
| 1a | SA | 92.0 | 2.1 | 3.7 | 0.3 | 1.9 | | | | |
| 1b | A | 90.3 | 2.0 | 5.8 | 0.2 | 1.7 | | | | |
| 3 | N | 89.0 | 5.8 | <0.1 | <0.1 | | 5.2 | | | |
| 4 | N | 84.3 | 3.0 | <0.1 | | | 12.7 | | | |
| 4 | N | 84.2 | 2.7 | 0.1 | <0.1 | | 13.0 | | | |
| 5 | N | 83.3 | 0.7 | 0.1 | <0.1 | | 16.0 | | | |
| 6 | N | 75.8 | <0.1 | <0.1 | <0.1 | | 24.2 | | | |
| 7 | N | 93.9 | 2.8 | 0.1 | <0.1 | | | 3.2 | | |
| 8 | N | 94.3 | 1.4 | 0.2 | | | | 4.0 | | |
| 9 | N | 91.2 | 1.7 | 0.2 | | | | 6.9 | | |
| 10 | N | 84.9 | 1.5 | 0.1 | | | | 13.6 | | |
| 11 | N | 79.8 | 1.6 | 0.2 | | | | 18.4 | | |
| 15 | N | 92.5 | 6.4 | 0.4 | | | | | 0.7 | |
| 22 | N | 85.3 | 0.6 | 0.7 | 0.5 | | 12.8 | | | |
| 23 | N | 90.4 | 3.2 | 0.09 | | 0.05 | | 6.3 | | |
| 24 | N | 86.0 | 3.1 | 0.02 | | | | 10.9 | | |
| 25 | N | 78.4 | 8.0 | 1.4 | | 0.11 | | 12.1 | | |
| 26 | N | 74.3 | 6.0 | 0.05 | | | | 19.4 | | |
| 27 | N | 66.7 | 1.5 | 0.16 | | | | 31.6 | | |
| 28 | N | 89.8 | 3.1 | 0.08 | <0.1 | 0.06 | | | | 6.3 |

This Example shows that upon co-melting the base glass with suitable metal oxides additives, phase separation at elevated temperatures, leaching out of the soft phase and washing in water, significant amounts of metal oxide additive can be introduced into the glass (e.g., up to at least 24 mol% in the case of $TiO_2$ and at least 18 mol% in the case of $ZrO_2$). Furthermore, comparison with Example 1 shows that the concentration of metal oxide additive in the porous glass correlates with, and can be controlled by, the amount of the corresponding metal oxide introduced into the original melt.

In addition, significant amounts of metal oxide additives (e.g., between 1 and at least 4 mol% in the case of alumina) can be incorporated in porous glass cation exchange materials by combined leaching and additive impregnation with acidic solutions of a corresponding metal salt. The amount of incorporated additive is related to the concentration of the metal salt in the doping solution. Surprisingly, immersion in a concentrated ionic solution (aqueous sodium nitrate and ammonia or ammonia alone) subsequent to doping does not remove the additive from the porous glass.

It should also be noted that glasses with large amounts of metal additives, such as the high-titania glasses 5 and 6, have very low residual boron oxide levels (less than 1%).

EXAMPLE 5

This Example illustrates the performance of several porous glasses prepared according to the procedures outlined in Examples 1-3 as ion exchange media in a synthetic, non-radioactive test solution.

The test procedure used for each of the glasses consisted of loading a volume of 5 mL of glass powder into a polymethylmethacrylate column with a 100-mm$^2$ cross section, passing the test solution through the column, taking samples of the column effluent at regular intervals, analyzing their chemical composition, and comparing it with that of the influent solution.

The following definitions are used in specifying ion exchange test conditions and test results in this Example and in the next Example. The volume of solution which has passed through the column at a particular point is given as the number of column volumes, CV, where one CV is a volume of solution equal to the volume of ion exchange material which makes up the column. The residence time, RT, is the time it takes for one CV of solution to pass through the column, and is inversely proportional to the flow rate. The decontamination factor, DF, is the ratio between the concentration of a particular species in the influent, i.e. in the solution entering the column, and the concentration of the same species in the effluent, i.e. in the solution leaving the column. As the volume of solution passing through the column increases, the column begins to approach saturation with respect to its ability to sorb further amounts of a particular species and the corresponding DF eventually decreases. The column capacity with respect to a given species is defined as the number of column volumes, CV, at which the corresponding DF has fallen to a particular value, for instance 10 or 2.

In the present Example the test solution was an aqueous solution containing 3000 mg/L of boron (introduced as $H_3BO_3$), 1000 mg/L of sodium (introduced as NaOH), 20 mg/L of cesium (introduced as $CsNO_3$), and 9 mg/L of cobalt (introduced as $Co(NO_3)_2.6H_2O$). The pH of test solution was 8.0 The residence time used in the test was approximately 1 minute. The species monitored in the test were cesium, determined by flame emission, and cobalt, determined by dc plasma spectroscopy. The test results for several porous glasses are shown in Table 6.

TABLE 6

| Base glass | Ion exchange | Column capacity, CV | | |
|---|---|---|---|---|
| | | DF 10 Cs | Cs | DF 2 Co |
| 1 | SA | | 367 | 73 |
| 1a | N | 40 | 358 | |
| 1a | SA | 800 | 903 | |
| 1b | A | 650 | 790 | |
| 7 | N | | 337 | 432 |
| 7 | SA | | 845 | 412 |
| 8 | SA | >900 | 274 | |
| 9 | SA | 769 | 329 | |
| 10 | SA | 762 | 675 | |
| 11 | SA | 874 | 77 | |

These results show that among glasses treated with sodium nitrate and ammonia or ammonia alone those containing additives such as zirconia or alumina, introduced either by co-melting or by leaching in an acidic solution of the additive, exhibit much higher ion exchange capacities than similarly treated glasses which were not previously doped with such additives. Furthermore, the results demonstrate that both the introduction of such additives and subsequent treatment with a primary ion exchange solution containing an alkali metal salt and ammonia or ammonia alone contribute to enhancing ion exchange capacities, and that the beneficial effects of these two processes re-inforce, rather than suppress, each other. Finally, comparison with the results of Example 4 shows that it is possible to control the ion exchange capacities of such porous glass materials with respect to various ions by controlling the composition of the porous glass.

EXAMPLE 6

This Example illustrates the performance of porous glass ion exchange materials in removing cesium from actual radioactive aqueous streams and from fully simulated solutions duplicating the analyzed chemical composition of such streams.

In addition to various porous glass materials, a conventional organic ion exchange resin was included in several tests for comparative purposes. This resin was Dowex HCR-S Strongly Acidic Cation Exchanger (Nuclear Grade, Hydrogen form, 8% crosslinked, −20 +50 dry mesh, Sigma Chemical Co., St. Louis, Missouri, cat. no. I8505).

The compositions of the solutions used in these tests are listed in Table 7.

TABLE 7

| SOLUTION | I | II | III |
|---|---|---|---|
| pH | 6.4 | 6.2 | 9.4 |
| Concentrations, mg/L: | | | |
| Na | 0.023 | 0.068 | 2.097 |
| K | 0.002 | 0.077 | 0.005 |
| Ca | 0.001 | 0.024 | 0.004 |
| Cl | 0.002 | 0.029 | 2.586 |
| $SO_4$ | 0.014 | 0.002 | 0.050 |
| $NO_3$ | <0.001 | 0.007 | 0.100 |
| $BO_3$ | 0.480 | 5.387 | 5.878 |
| Cs-137, 134 activity, uCi/L | 0.50 | 0.55 | 1.05 |

Solution I was prepared to simulate typical compositions of waste-water from a PWR (pressurized-water reactor) nuclear plant. Solution I was doped with realistic levels of Cs-137 activity. Solutions II and III were actual samples of nuclear plant waste-water.

Test column operation, influent and effluent analysis, and data processing generally followed the description in the previous Example. The volumes of ion exchange materials used in each column ranged between 0.3 and 15 mL. Cesium levels were determined by means of gamma spectrometry using a sodium iodide detector and a multi-channel analyzer. The results of the test column runs are listed in Table 8.

TABLE 8

| Solution | Glass or resin | Ion exchange | Residence time, min | Cesium capacity, CV DF 10 | DF 2 |
|---|---|---|---|---|---|
| I | 2 | SA | 0.6 | 4,000 | 10,000 |
|   | 7 | SA | 0.6 | 19,000 | 24,000 |

TABLE 8-continued

| Solution | Glass or resin | Ion exchange | Residence time, min | Cesium capacity, CV DF 10 | DF 2 |
|---|---|---|---|---|---|
| II | HCR-S |   | 2.7 | 150 |   |
|    | 2 | SA | 4.1 | 1010 |   |
|    | 7 | SA | 3.4 | >1370 |   |
| III | HCR-S |   | 6.0 | 10 |   |
|     | 2 | SA | 8.5 | 100 |   |
|     | 7 | SA | 8.4 | 340 |   |

These results show that the Cs capacities of the sodium-exchanged porous glass with zirconia additive are significantly higher in all cases than those obtained with sodium-exchanged porous glass without additives, and are even higher compared with the capacities obtained with a nuclear grade strong-acid cation exchanger which has been widely used for cesium removal in the nuclear industry.

It should be noted that the ion exchange porous glasses used in removing radioactive species from liquid streams can be conveniently dried, incorporated into various solid matrices, re-melted in the presence of additives, or thermally consolidated to immobilize and confine the radioactive species.

EXAMPLE 7

This Example illustrates the performance of porous glass co-melted with ruthenia additive as a catalyst.

Samples of Glass No. 2, which does not contain additives, and of Glass No. 14, which contains comelted ruthenia additive, were crushed, sieved, heat treated, leached, washed, and dried according to the procedures described in Examples 1-3. Thereafter the catalytic activity of each of the glasses was tested by stirring a quantity of 20–30 mg of each glass with a volume of 6 mL of an argon-saturated aqueous 0.1 M $Ce(NH_4)_2(NO_3)_6$ solution for 24–30 minutes and measuring the volume of evolved oxygen, generated by the catalytic oxidation of water, using a Varian Aerograph gas chromatograph with a molecular sieves column and a thermal conductivity detector. $RuO_2$ is known to be an effective catalyst of the oxidation of water by $Ce^{4+}$, according to Kiwi and Gratzel, Chimia, 33, 289–291 (1979). The amount of oxygen generated in the case of Glass No. 14 was observed to be 8.0 micromole per gram of glass present in the system. The corresponding amount of oxygen generated in the case of Glass No. 2 did not exceed 0.6 micromole per gram of glass. These results show that the porous glass prepared from the ruthenia-containing melt exhibits a significant amount of catalytic activity characteristic of active $RuO_2$ while the ruthenia-free porous glass does not exhibit significant catalytic activity.

EXAMPLE 8

This example compares the performance of porous glasses prepared according to the procedures outlined in Example 1-3 with and without the introduction of transition metal oxide additives, as ion exchange media in separating rare earth mixtures.

The separation process selected to test the glass was the removal of neodymium, an undesirable, strongly light-absorbing species, from lanthanum, a highly transparent component of oxide-based and flouride-based optical glasses and fibers. Lanthanum is also more effective than neodymium in oxide-based superconducting materials.

The decontamination factor, DF, is obtained by means of dividing the La:Nd ratio in the influent, i.e., in the solution entering the column, by the corresponding ratio in the effluent, i.e. in the solution leaving the column.

In the present Example, the test solution was an aqueous solution containing approximately 100 mg/L of La and 100 mg/L of Nd, both rare earths introduced as aqueous solutions of the respective nitrate salts. The solution was acidifies with nitric acid to pH 1.3. The residence time used in the test was approximately 30 minutes. The test results for two porous glasses listed in Table 1 are shown in Table 2.

It can be concluded that the ion exchange porous glass 3-SA with the zirconia additive is effective in removing Nd from La (10 CV at DF of at least 2) while the glass without transition metal oxide additives 1-SA does not exhibit a significant capacity for rare earth separation.

TABLE 9

| | Glass 1-SA | | | Glass 23-SA | | |
|---|---|---|---|---|---|---|
| CV | conc., mg/L La | Nd | DF | conc., mg/L La | Nd | DF |
| 8 | 0.20 | 0.25 | 0.9 | 0.05 | <0.05 | >1 |
| 10 | 5.0 | 9.1 | 0.6 | <0.5 | 0.05 | <1 |
| 12 | 156 | 121 | 1.4 | 0.2 | <0.1 | >2 |
| 14 | 173 | 205 | 0.9 | 0.5 | <0.1 | >5 |
| 16 | 166 | 180 | 1.0 | 2.6 | <1 | >3 |
| 18 | 169 | 163 | 1.2 | 216 | 50.1 | 4.8 |
| 20 | 169 | 153 | 1.2 | 296 | 170 | 2.0 |
| 22 | 134 | 129 | 1.2 | 213 | 243 | 1.0 |
| Infl. | 95.9 | 107.5 | | 95.9 | 107.5 | |

EXAMPLE 9

This example illustrates the performance of several porous glasses with metal oxide additives, prepared according to the procedures outlined in Example 1–3, in separating rare earth mixture.

The test procedure was again based on the separation of Neodymium from lanthanum, as in Example 8. The influent in this case was selected more realistically with respect to lanthanum purification, i.e. it contained a low concentration of Nd, approximately 50 mg/L, in the presence of a high concentration of La, approximately 2 g/L. The solution was not acidified and had a pH of 3.8±0.3 in all cases. The residence time was (49±7) minutes in all cases except one. The results are listed in Table 10. The capacity is defined as the number of column volumes at which the DF falls below 10.

The major conclusions based on these results can be summarized as follows:

a. Materials without the ion exchange treatment (Glasses 2-N and 3-N) do not exhibit significant capacity for rare earth separation.

b. The capacity of glasses with $ZrO_2$ additive for La/Nd separation increases with $ZrO_2$ content up to about 12%. Further increases in $ZrO_2$ content do not appear to result in larger capacities.

c. The capacity and decontamination factor obtained with a 13% $TiO_2$ glass are not significantly different from those abtained with glasses with similar amounts of $ZrO_2$. The capacity and decontamination factor of a 6% $HfO_2$ glass are similar to those obtained with a 6% $ZrO_2$ glass.

d. As expected, an increase in residence time greatly improves the decontamination factor.

TABLE 10

| GLASS | CAPACITY |
|---|---|
| 22-N | 0 |
| 22-SA | 15 |
| 23-N | 0 |
| 23-SA | 12 |
| 24-SA | 13 |
| 25-SA | 22 |
| 26-SA | >24 |
| 27-SA | 20 |
| 28-SA | 10 |

The invention has been described in detail with particular reference to preferred embodiments thereof, but it will be understood that variations and modifications can be effected within the spirit and scope of the invention.

What is claimed is:

1. A process for chromatographically separating from each other rare earth ions or actinide ions or mixtures thereof in solution which comprises passing said solution through an ion exchange material to separate said rare earths or actinides or mixtures thereof, said ion exchange material having a surface area of about 5–1500 $m^2/g$, said ion exchange material containing at least 50 mol % silica, said ion exchange material having been impregnated with a liquid containing alkali metal cations, Group Ib metal cations, ammonium cations, organic amines, or mixtures thereof at a pH range above about 9, and collecting a plurality of fractions of said solution as said solution passes through said ion exchange material.

2. A process according to claim 1 wherein said ion exchange material includes at least about 0.2 mol percent of a metal oxide or hydrous metal oxide, said metal oxide or hydrous metal oxide being selected from the group consisting of the transition metals of Groups IIIa, IVa, Va, VIa, VIIa, VIII, Ib, and IIb of the Periodic Table, aluminum, gallium, indium, thallium, tin, lead, bismuth, beryllium, the actinides, and mixtures thereof.

3. A process according to claim 1 in which said ion exchange material is porous glass or silica gel.

4. A process according to claim 3 wherein said metal oxide or hydrous metal oxide is selected from the group consisting of titania, zirconia, hafnia, thoria, or mixtures thereof.

5. A process according to claim 2 wherein the content of metal oxide or hydrous metal oxide in said porous glass is about 2 to about 35 mol percent.

6. A process according to claim 1 wherein said solution containing rare earth ions, actinide ions or mixtures thereof is passed through a column containing said ion exchange material.

7. A process according to claim 1, 2, or 3 wherein said rare earth ions include lanthanum and neodymium and at least one of these two rare earths is substantially separated from the other.

8. A process according to claim 7 wherein lanthanum is purified to contain less than about 0.1 ppm of neodymium.

9. A process according to claim 1 wherein the more strongly complexable rare earth ions or actinide ions are retained on the ion exchange material in preference to the less strongly complexable rare earth ions or actinide ions.

10. A process according to claim 1 wherein said rare earth ions include lanthanum and neodymium in which lanthanum is collected in a fraction of said solution prior to the neodynium being collected in another fraction of said solution.

11. A method of producing a porous silicate glass containing at least one transition metal oxide additive selected from a group consisting of the bottom two rows of Group VIII of the Periodic Table and of rhenium which comprises preparing a base glass from a melt which contains 40–80 mol percent of silica and an amount greater than zero and up to 10 mol percent of one or more transition metal oxide additives selected from said group or of precursors of said oxide additives, separating said base glass by heat treatment into at least a soluble phase and an insoluble phase, and leaching out the soluble phase to obtain a porous glass containing at least 50 mol percent silica and a sufficient amount of said oxide or additives to cause said porous glass to exhibit catalytic activity indicative of the presence of said additive or additives.

12. A method according to claim 11 wherein said oxide additive is an oxide of ruthenium.

13. An ion exchange material having a surface area of about 5–1500 $m^2/g$, said ion exchange material being a porous glass or silica gel, said ion exchange material including at least about 0.2 mol percent of a metal oxide or hydrous metal oxide, said metal oxide or hydrous metal oxide being selected from the group consisting of the transition metals of Groups IIIa, IVa, Va, VIa, VIIa, VIII, Ib, and IIb of the Periodic Table, aluminum, gallium, indium, thallium, tin, lead, bismuth, beryllium, the actinides, and mixtures thereof, said ion exchange material containing at least about 0.3 mol percent of ammonium cations., organic amines, or mixtures thereof.

14. An ion exchange material according to claim 13 wherein said porous glass is prepared by a process comprising producing a base glass from a melt which contains 40 to 80 mol percent of silica and between 0.2 and 35 mol percent of one or more transition metal oxides selected from the group consisting of the transition metals of Groups IVa, Va, VIa, VIIa and VIII of the Periodic Table and of the actinides, separating said base glass by heat treatment into at least a soluble phase and an insoluble phase, and leaching out the soluble phase to obtain a porous glass containing at least 50 mol percent silica and at least 0.2 mol percent of said transition metal oxides.

15. An ion exchange material according to claim 13 wherein said porous glass is prepared by melting a base glass which contains 40 to 80 mol percent silica, separating said base glass by heat treatment into at least a soluble phase and an insoluble phase, leaching the soluble phase, and treating said phase separated glass with a solution of one or more salts of said transition metals of Groups IIIa, IVa, Va, VIa, VIIa, VIII, Ib and IIb of the Periodic Table, aluminum, gallium, indium, thallium, tin, lead, bismuth, beryllium and the actinides.

16. An ion exchange material according to claim 13 wherein said porous glass is prepared by melting a base glass which contains 40–80 mol percent silica, separating said base glass by heat treatment into at least a soluble phase and an insoluble phase, and treating said phase separated glass with a solution of one or more salts of additive elements selected from the group consisting of the alkaline earth metals, the transition metals of Groups IIIa, IVa, Va, VIa, VIIa, VIII, Ib, and IIb of the Periodic Table, aluminum, gallium, indium, thallium, tin, lead, bismuth, the rare earth metals, and the actinides, said solution having a pH value lower than about 4, to effect both leaching out of the soluble phase and introduction of said additive element or elements onto the resulting porous glass.

17. A method according to claim 16 wherein said base glass contains 40–70 mol percent of silica.

18. An ion exchange material according to claim 13 wherein said transition metal consists of titanium, zirconium, hafnium, aluminum, or mixtures thereof.

* * * * *